(12) United States Patent
Brown

(10) Patent No.: US 7,567,478 B2  
(45) Date of Patent: Jul. 28, 2009

(54) LEAKAGE OPTIMIZED MEMORY

(75) Inventor: Jeffrey S. Brown, Fort Collins, CO (US)

(73) Assignee: LSI Corporation, Milpitas, CA (US)

( * ) Notice: Subject to any disclaimer, the term of this patent is extended or adjusted under 35 U.S.C. 154(b) by 4 days.

(21) Appl. No.: 11/868,576

(22) Filed: Oct. 8, 2007

(65) Prior Publication Data

US 2009/0091999 A1    Apr. 9, 2009

(51) Int. Cl.  
*G11C 5/14* (2006.01)  
*G11C 8/14* (2006.01)

(52) U.S. Cl. .................. 365/227; 365/230.03; 365/94

(58) Field of Classification Search .............. None  
See application file for complete search history.

(56) References Cited

U.S. PATENT DOCUMENTS 5,953,244 A * 9/1999 Okada et al. ............... 365/63  
6,208,567 B1 * 3/2001 Yamauchi et al. ........... 365/200  
6,321,313 B1 * 11/2001 Ishii et al. .................. 711/163

* cited by examiner

*Primary Examiner*—Tan T. Nguyen  
(74) *Attorney, Agent, or Firm*—Christopher P. Maiorana, P.C.

(57) ABSTRACT

A method of power optimization in a memory is disclosed. The method generally includes the steps of (A) dividing a plurality of bit cells in a design of the memory into (i) a plurality of first rows storing programmed data and (ii) at least one second row storing only padding data, (B) adjusting the design such that a second power consumption in each of the second rows is lower than a first power consumption in each of the first rows and (C) generating a file defining the design as adjusted.

21 Claims, 5 Drawing Sheets

LEAKAGE OPTIMIZED MEMORY

FIELD OF THE INVENTION

The present invention relates to read-only memories generally and, more particularly, to a leakage optimized memory.

BACKGROUND OF THE INVENTION

Memory core cell arrays within read-only memories (ROM) are conventionally constructed of low-leakage devices. In contrast, the internal memory control modules within the ROM do not use low-leakage devices. Depending on system level usage, some internal memory control modules are never utilized and yet still draw a leakage power. As such, many ROM implementations draw an excessive amount of power relative to the amount of programmed data actually stored within.

SUMMARY OF THE INVENTION

The present invention concerns a method of power optimization in a memory. The method generally comprises the steps of (A) dividing a plurality of bit cells in a design of the memory into (i) a plurality of first rows storing programmed data and (ii) at least one second row storing only padding data, (B) adjusting the design such that a second power consumption in each of the second rows is lower than a first power consumption in each of the first rows and (C) generating a file defining the design as adjusted.

The objects, features and advantages of the present invention include providing a leakage optimized memory that may (i) reduce static power consumption compared with conventional techniques, (ii) adjust static power consumption based on a system level of use, (iii) be implemented with a single additional masking step, (iv) be implemented with no masking changes and/or (v) maintain accessability to padded bit cells.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

The present invention is generally related to embedded memory compilers and read-only memories (ROMS). When a ROM is compiled, a ROM data file may be prepared, the data may be read into the compiler and the memory programmed accordingly. Typically, a storage capacity of the ROM exceeds an amount of data to be programmed. Therefore, an upper end of an address range within the ROM may remain un-programmed by the data. As such, the ROM data file may be padded with predetermined data to account for the entire capacity of the ROM. The predetermined data is generally selected to draw minimal dynamic power when coupled to pre-charged bitlines (e.g., program logical high padded bits for logically high pre-charged bitlines).

At a compile time, the padded data may be seen in the data file. The present invention generally alters a layout and/or fabrication process of the control logic and/or bit cells associated with accessing the padded data to minimize static leakage current. For instance, if a ROM layout has many (e.g., 128) rows and one or more upper rows (e.g., 8 rows) are programmed with only padded data, a row driver module associated with each of the padded rows may be optimized for static leakage current. Any increased delay through the optimized row driver modules may be irrelevant as the padded data should never be access, or at least rarely accessed. Leakage current optimization may be achieved in a number of ways ranging from completely removing some or all of the devices, lengthening some or all of the gate channel lengths within the control logic and/or changing a substrate doping (e.g., a higher threshold implant) over the region of the control logic associated with the padded data.

An overestimation of an anticipated memory size early in a design cycle generally amplifies the static power consumption problem. For example, if a ROM design is originally targeted to have 3072 words, but the final ROM code uses only ⅓ of the words, a majority of the ROM memory adds to a leakage current overhead without storing useful data. To minimize the leakage current, a flag may be passed at compile time for any memory type signifying a maximum address that may be accessed and/or a list of locations that should never be accessed. For example, if an 8192×16 dual port memory is compiled for a chip and a system level designer flags that the last 512 words should never be accessed, the memory compiler may act accordingly and replace the control logic modules used to access such locations with lower-leakage-current versions.

Figure 1:
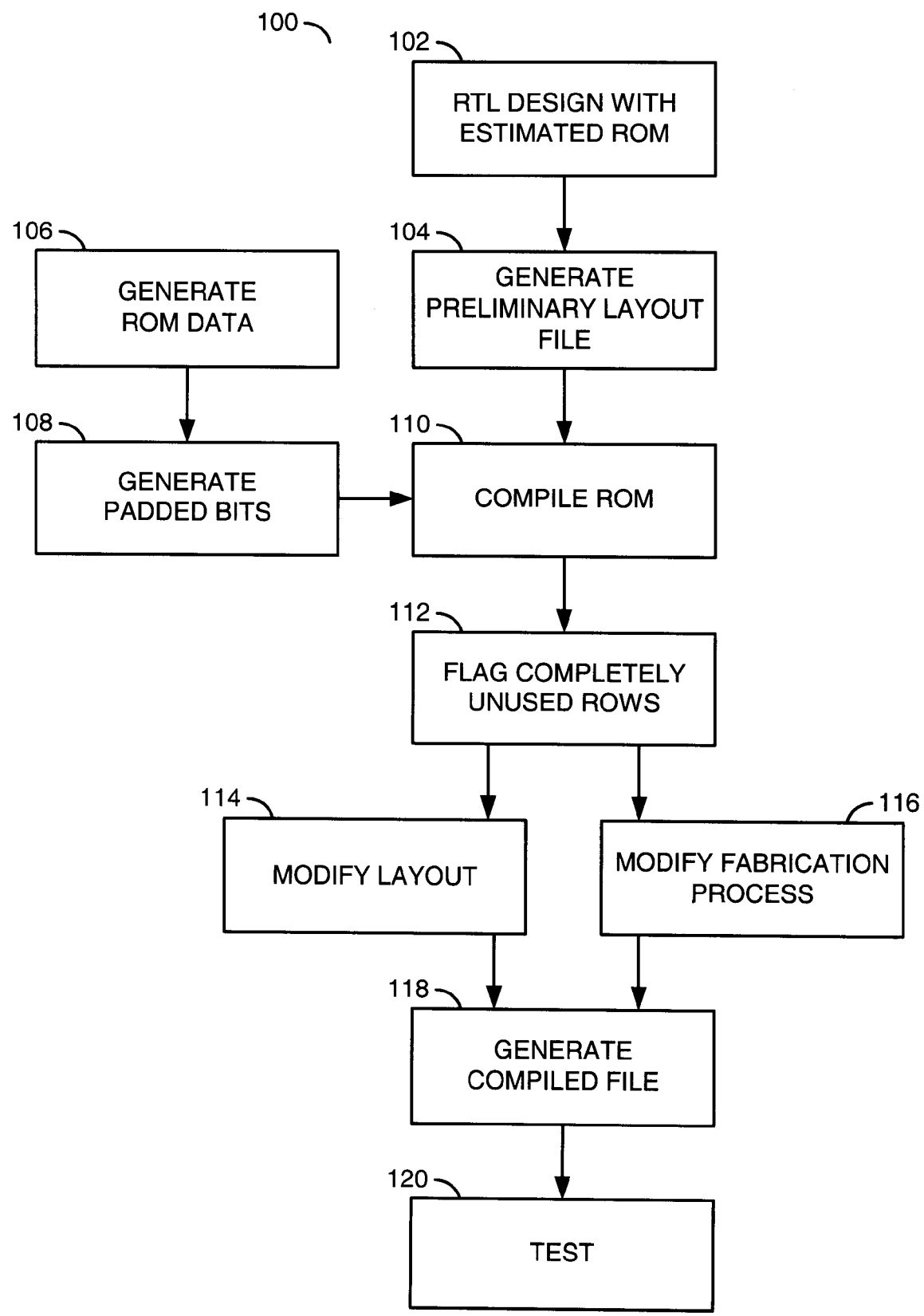
FIG. 1 is a flow diagram of an example method of creating a leakage optimized memory in accordance with a preferred embodiment of the present invention.

Referring to FIG. 1, a flow diagram of an example method 100 of creating a leakage optimized memory is shown in accordance with a preferred embodiment of the present invention. The method (or process) 100 may be implemented in hardware and/or software executing on a computer system. The method 100 generally comprises a step (or block) 102, a step (or block) 104, a step (or block) 106, a step (or block) 108, a step (or block) 110, a step (or block) 112, a step (or block) 114, a step (or block) 116, a step (or block) 118 and a step (or block) 120.

In the step 102, a Register Transfer Level (RTL) design of a circuit having an embedded memory may be created in an initial design file. A preliminary layout of the circuit may be performed in the step 104 and stored in a preliminary layout file. During or after the preliminary layout of the circuit is performed, data to be stored in the memory may be generated in the step 106 and stored in a ROM data file. The data may include instructions for one or more processors and/or information to be used within the circuit, such as programmable parameters, offsets, cryptography codes and the like. Since the memory capacity is often established before the final programmed data is known, the memory is usually sized to meet a worst-case anticipated situation. After the final capacity of the memory is known, padded data may be included into the ROM data file in the step 108 such that the size of data in the ROM data file matches the memory capacity of the memory in the preliminary layout file.

In the step 110, the compiler may allocate the data (both programmed and padded) from the ROM data file to the memory. In compiling the memory, many rows of bit cells within the memory may store the programmed data, some rows may store a mixture of programmed data and padded data, and one or more rows may store only padded data. Rows containing only padded data may be flagged in the step 112 for further processing.

The additional processing may involve (i) modifying a layout of the circuit and/or (ii) modifying one or more fabrication steps to be used in manufacturing the circuit. Layout modifications may be performed in the step 114. Fabrication process modifications may be performed in the step 116.

After the adjustments to the layout/fabrication process have been made, a completed circuit definition may be generated and stored in a compiled file in the step 118. The finished circuit, as defined in the compiled file, may be tested in the step 120. Testing may include, but is not limited to, design rule checking, layout vs. schematic check, timing analysis and the like.

Figure 2:
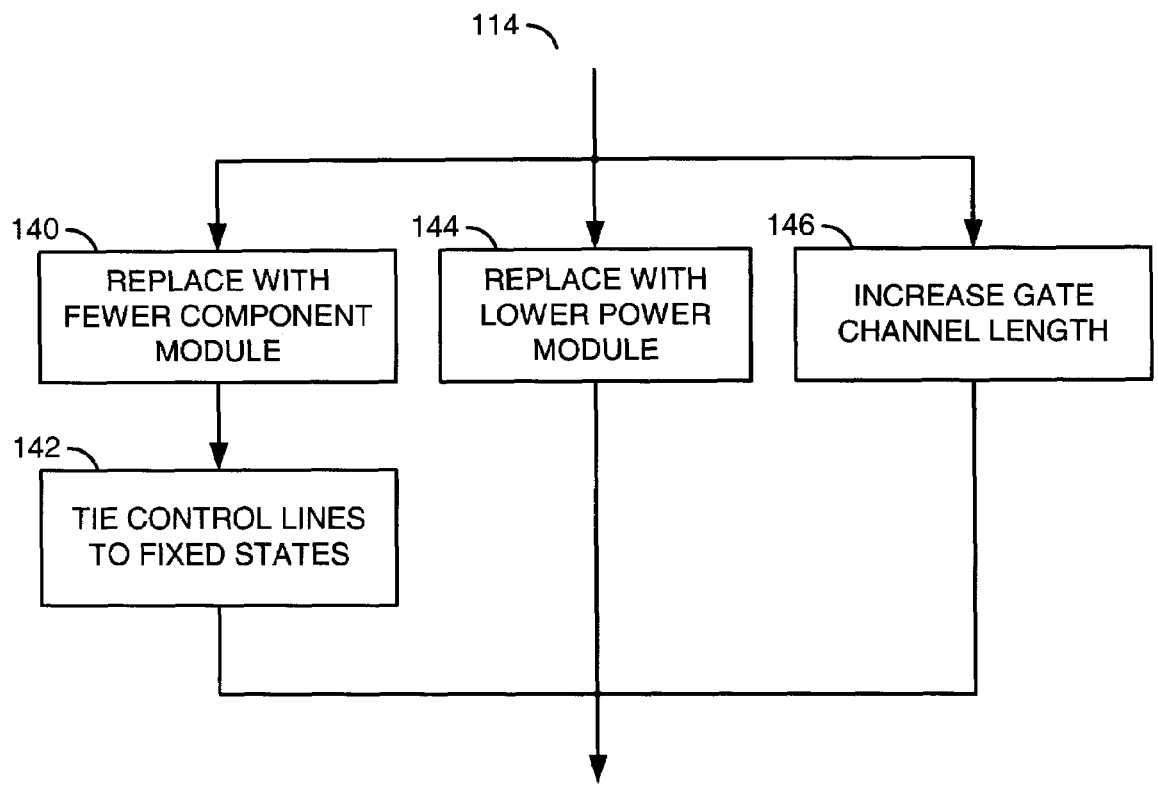
FIG. 2 is a detailed flow diagram of an example implementation of a layout modification method.

Referring to FIG. 2, a detailed flow diagram of an example implementation of the layout modification step 114 is shown. The layout modification method (or process) 114 generally comprises a step (or block) 140, a step (or block) 142, a step (or block) 144 and a step (or block) 146. The method 114 may be implemented in hardware and/or software executing on a computer system.

Layout modification may be accomplished in the step 140 by replacing one or more original modules in the unused rows of the memory (e.g., contain only padded data) with substitute modules that have fewer components than the original modules. A lower gate count in the substitute modules compared with the original modules generally results in a lower leakage current. The gate count may be lowered by replacing one or more transistors and/or logic gates in the original modules with direct connections to a logical high voltage level and/or a logical low voltage level in the step 142. By replacing active circuitry with direct connections to power rails, the leakage currents may be reduced even further.

Layout modifications may be accomplished by replacing one or more original modules in the unused rows of the memory with lower power versions of the original modules in the step 144. The memory compilers generally build the memory module from tiling leaf cells. Swapping in low leakage versions of the control logic and/or row drivers in the unused rows may be easily accomplished. Since the lower power replacement modules generally have lower leakage currents than the original modules, the overall static power consumption of the memory may be reduced due to the swapping.

Figure 3:
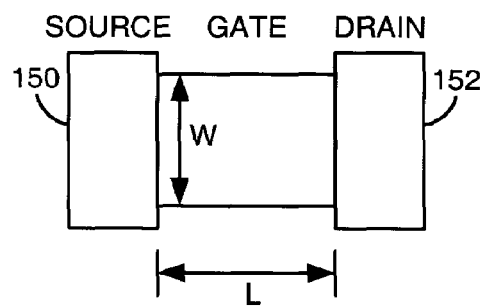
FIG. 3 is a top view of an example transistor structure.

Another layout modification approach may involve lengthening a gate channel length of one or more transistors in one or more unused rows of the memory in the step 146. Per FIG. 3, the gate channel length is generally a distance (e.g., L) between a source diffusion 150 and a drain diffusion 152 of the transistor. Lengthening a gate channel length may reduce the leakage current of the transistor and therefore lower the static power consumed.

Figure 4:
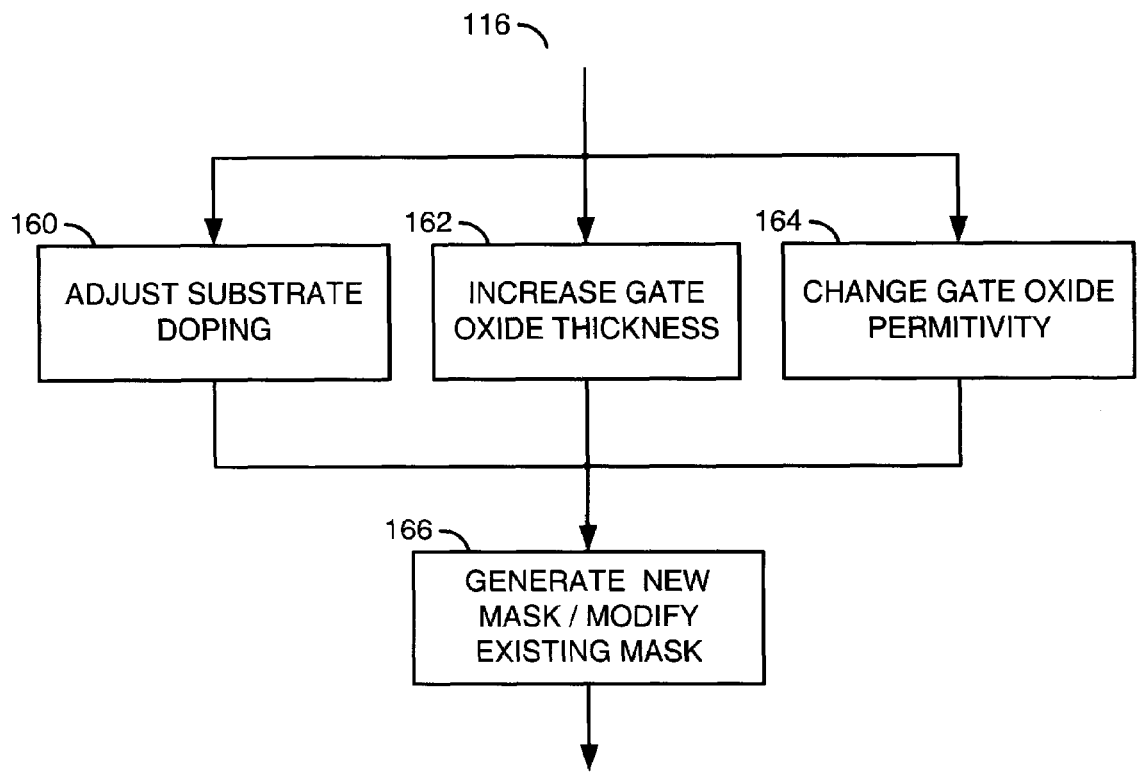
FIG. 4 is a detailed flow diagram of an example implementation of a fabrication modification method.

Referring to FIG. 4, a detailed flow diagram of an example implementation of the fabrication modification step 116 is shown. The fabrication modification method (or process) 116 generally comprises a step (or block) 160, a step (or block) 162, a step (or block) 164 and a step (or block) 166. The method 116 may be implemented in hardware and/or software executing on a computer system.

A fabrication modification may be accomplished in the step 160 by adjusting a doping level in particular areas of the substrate associated with the unused rows of the memory. The substrate doping adjustment may be adapted to increase a threshold voltage of the transistors formed in the adjusted areas of the substrate. Increasing the transistor threshold voltages generally decreases the leakage current of such transistors, leading to a reduction in the overall power consumption of the memory. Doping levels may be changed by one or more fabrication techniques, such as ion implantation, ion diffusion and the like.

Figure 5:
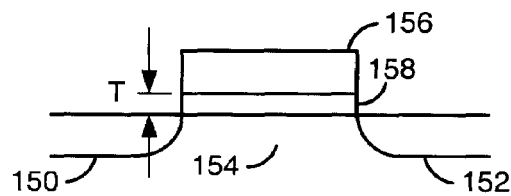
FIG. 5 is a cross-sectional view of the example transistor structure.

Another fabrication modification may be accomplished by creating thicker gate oxides in one or more transistors in the unused rows of the memory per step 162. Per FIG. 5, the gate oxide thickness is generally a distance (e.g., T) between a substrate 154 and a gate 156. Increasing the gate oxide thickness generally increases the transistor threshold voltage. As mentioned above, increasing the transistor threshold voltage generally decreases the static leakage current. The gate oxide thickness may be increased by one or more techniques, such as increasing a time and/or rate of oxide growth, depositing additional material over thin oxide layers, and the like.

Fabrication of the transistors in the unused rows of the memory may also be modified by adjusting the permittivity of the thin gate oxides 158 (with or without increasing the gate oxide thickness T). Varying the permittivity may alter the transistor threshold voltage, and thus alter the static leakage current of the transistor. The permittivity may be adjusted by using different materials for the gate oxide 158, altering the growth rate of the oxides 158, altering the atmosphere in which the oxides 158 are grown and the like.

The modifications to the fabrication process may result in (i) the introduction of one or more new fabrication steps, (ii) exposing the areas forming the unused rows of the memory to one or more fabrication steps that the areas would otherwise avoid and/or (iii) masking one or more fabrication steps from the unused row areas. To account for the changes in the fabrication, one or more new masking layers may be created and/or one or more existing masking layers may be modified. For example, a single new mask controlling a new ion implantation step may be created to adjust the transistor threshold voltages in the unused rows of the memory. If the ion implantation step is normally performed as part of the chip fabrication, an existing implant mask may be altered to expose the transistors in the unused rows to the ion implantation.

Figure 6:
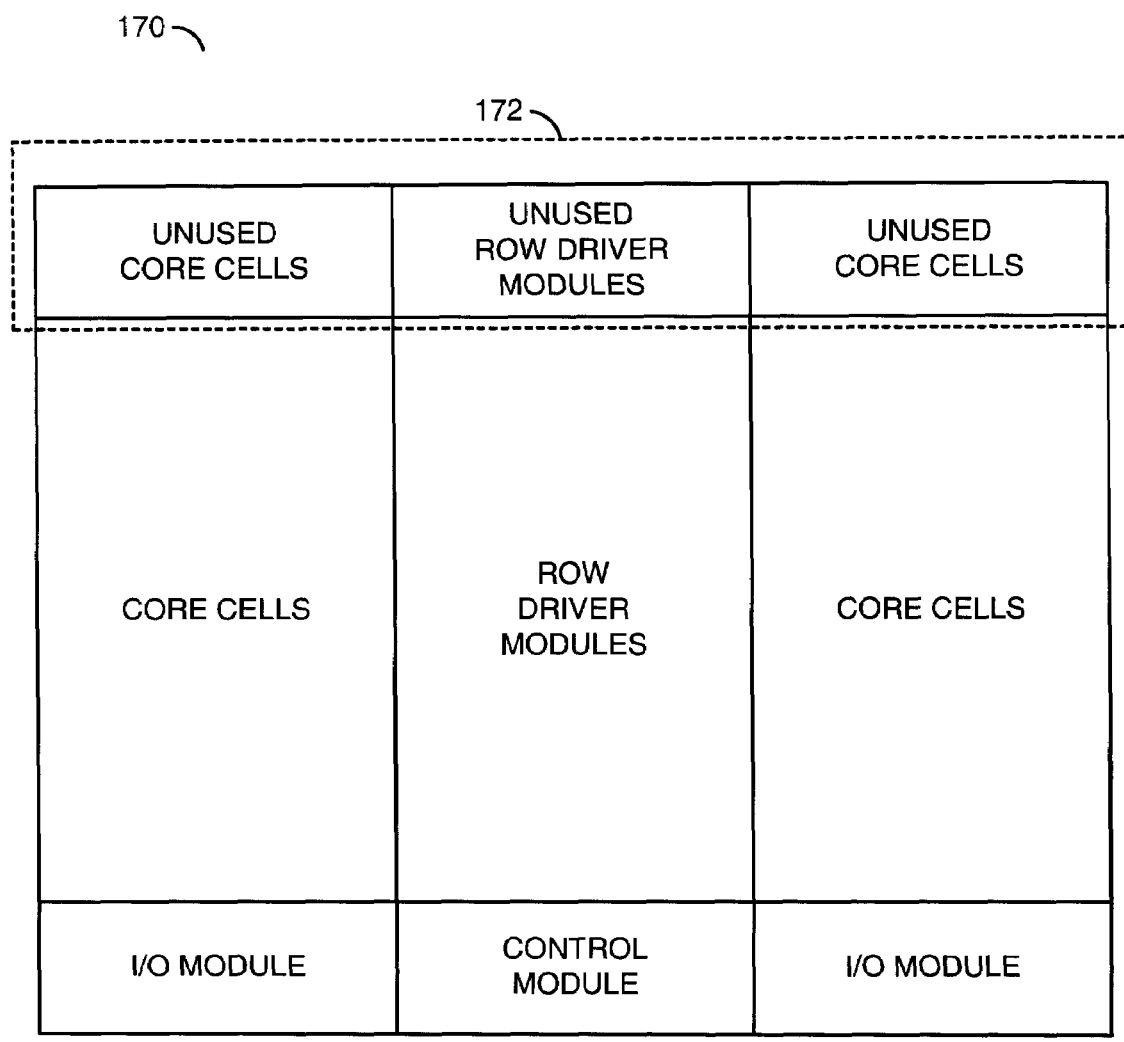
FIG. 6 is a diagram of a first example application of an adjustment.

Referring to FIG. 6, a diagram of a first example application of an adjustment is shown. A memory 170 may be viewed as multiple columns of core cells (or bit cells) disposed around a central column of row driver modules. Below each column of core cells, input/output (I/O) modules may be created to read/write the data from/to the cells. A control module may be formed below the row driver modules to control which particular row is accessed during a read cycle and a write cycle.

After the ROM data file has been generated, the padded data may be examined to identify the rows of the memory holding only padded data. A region (or area) 172 may be defined that covers all of the unused rows. Within the region 172, the fabrication process and/or layout may be adjusted to decrease the leakage current of some to all of the transistors in the unused core cells and in the unused row driver modules. When fabricated, the unused rows may remain functional. However, access times to the core cells in the region 172 may be slower than the access times to the rest of the core cells.

In asynchronous designs incorporating a dummy "self-timing" column, the dummy bit cell used to establish the timing may be disposed within an unused row. To maintain proper timing of the dummy column, the region 172 may be modified to avoid the dummy column and the associated row driver module.

Figure 7:
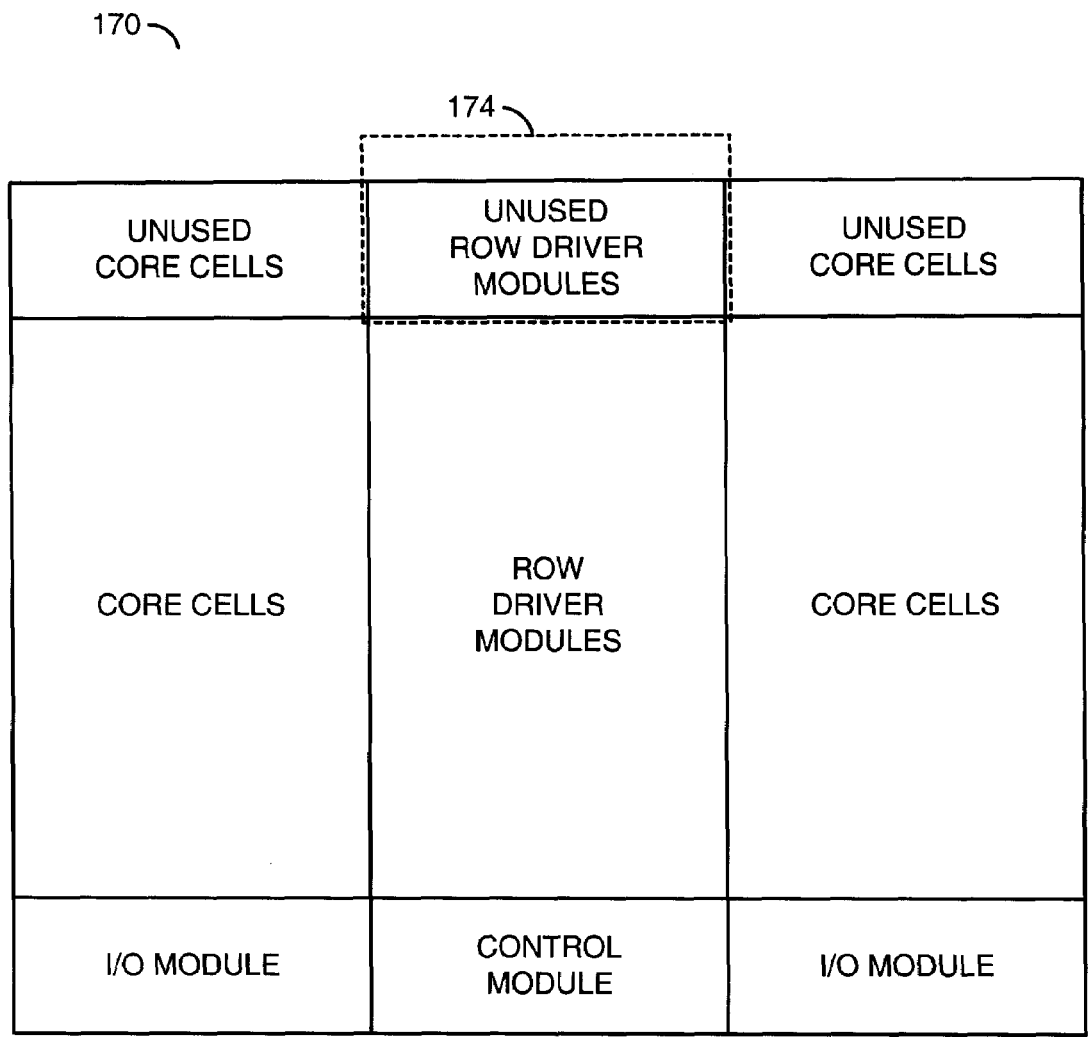
FIG. 7 is a diagram of a second example application of an adjustment.

Referring to FIG. 7, a diagram of a second example application of an adjustment is shown. The leakage current consumed in the unused rows of the memory 170 may be reduced by adjusting the fabrication and/or layout of only the unused row driver modules (e.g., area 174). The fabrication and/or layout of the unused core cells may remain the same as the fabrication of the active core cells. As such, if the unused core cells are accessed, a response from the unused core cells may be similar to that of the used core cells.

The techniques of the present invention may be used to customize the performance of rows in memory arrays holding programmed data. Performance variations (and leakage currents) across the memory array rows may be used to shrink the data output hold parameter to match a data access time window in non-self-timed memories. For instance, in a memory implementing inverter sense modules, an access to low rows in the array may occur much faster than an access to upper row in the array. By applying the present invention to adjust the channel length and/or the threshold voltages, access to the lower rows may be slowed while access to the upper rows may remain as fast as possible. Hence, in the inverter sensed architected memory, the data output hold time may be trimmed to closely match the data access time.

The function performed by the flow diagrams of FIGS. 1, 2, 4, 6 and 7 may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, magneto-optical disks, ROMs, RAMs, EPROMs, EEPROMs, Flash memory, magnetic or optical cards, or any type of media suitable for storing electronic instructions.

While the invention has been particularly shown and described with reference to the preferred embodiments thereof, it will be understood by those skilled in the art that various changes in form and details may be made without departing from the scope of the invention.

The invention claimed is:

1. A method of power optimization in a memory, comprising the steps of:
(A) dividing a plurality of bit cells in a design of said memory into (i) a plurality of first rows storing programmed data and (ii) at least one second row storing only padding data;
(B) adjusting said design such that a second power consumption in each of said second rows is lower than a first power consumption in each of said first rows; and
(C) generating a file defining said design as adjusted.

2. The method according to claim 1, wherein said second power consumption comprises a static leakage current.

3. The method according to claim 1, wherein step (B) comprises the sub-step of:
increasing a gate channel length of at least one transistor in each of said second rows to reduce a leakage current.

4. The method according to claim 1, wherein step (B) comprises the sub-step of:
replacing an initial version of a row driver module in each of said second rows with a substitute version that consumes less static power.

5. The method according to claim 1, wherein step (B) comprises the sub-step of:
replacing an initial version of a row driver module in each of said second rows with a substitute version having fewer components.

6. The method according to claim 5, wherein said substitute version of said row driver module ties a word line to a non-selected state.

7. A method of power optimization in a memory, comprising the steps of:
(A) dividing a plurality of bit cells in a design of said memory into (i) a plurality of first rows storing programmed data and (ii) at least one second row storing only padding data;
(B) adjusting a fabrication process of said memory such that a second power consumption in each of said second rows is lower than a first power consumption in each of said first rows; and
(C) generating a file defining said fabrication process as adjusted.

8. The method according to claim 7, wherein said second power consumption comprises a static leakage current.

9. The method according to claim 7, wherein step (B) comprises the sub-step of:
adjusting a substrate doping to increase a transistor threshold voltage in said second rows.

10. The method according to claim 7, wherein step (B) comprises the sub-step of:
adjusting a transistor gate oxide in said second rows.

11. The method according to claim 7, wherein step (B) comprises the sub-step of:
adjusting at most one masking layer that distinguishes between said first rows and said second rows.

12. The method according to claim 7, wherein said adjustment of said fabrication process is confined to a row driver module in each of said second rows.

13. A memory comprising:
a plurality of first rows each comprising a plurality of first bit cells storing programmed data, each of said first rows having a first power consumption; and
a plurality of second rows each comprising a plurality of second bit cells storing only padding data, each of said second rows having a second power consumption such that said second power consumption is less than said first power consumption, wherein said second rows have a different layout than said first rows.

14. The memory according to claim 13, wherein said second power consumption comprises a static leakage current.

15. The memory according to claim 13, wherein said memory comprises a read-only memory.

16. The memory according to claim 13, wherein said different layout comprises a first row driver module in each of said first rows and a second row driver module in each of said second rows such that each of said second row driver modules consumes less power than each of said first row driver modules.

17. The memory according to claim 16, wherein each of said second row driver modules has at least one of (i) a particular transistor having a longer gate channel length than a corresponding transistor in said first row driver modules and (ii) at least one less component than said first row driver modules.

18. The memory according to claim 13, wherein said second rows undergo at least one different fabrication step than said first rows.

19. The memory according to claim 18, wherein said different fabrication step creates a lower leakage current in said second rows than in said first rows.

20. A memory comprising:
- a plurality of first rows each comprising a plurality of first bit cells storing programmed data, each of said first rows having a first power consumption; and
- a plurality of second rows each comprising a plurality of second bit cells storing only padding data, each of said second rows having a second power consumption such that said second power consumption is less than said first power consumption, wherein said second rows undergo at least one different fabrication step than said first rows.

21. The memory according to claim 20, wherein said second rows have a different layout than said first rows.

\* \* \* \* \*